United States Patent
Byron et al.

(10) Patent No.: US 10,382,440 B2
(45) Date of Patent: Aug. 13, 2019

(54) METHOD TO ALLOW FOR QUESTION AND ANSWER SYSTEM TO DYNAMICALLY RETURN DIFFERENT RESPONSES BASED ON ROLES

(71) Applicant: International Business Machines Corporation, Armonk, NY (US)

(72) Inventors: Donna K. Byron, Petersham, MA (US); Elie Feirouz, Lexington, MA (US); Daniel M. Jamrog, Acton, MA (US); Kristin A. Witherspoon, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 15/273,136

(22) Filed: Sep. 22, 2016

(65) Prior Publication Data

US 2018/0081934 A1    Mar. 22, 2018

(51) Int. Cl.
*H04L 29/06*    (2006.01)
*G06F 17/27*    (2006.01)
(Continued)

(52) U.S. Cl.
CPC .......... *H04L 63/10* (2013.01); *G06F 17/2705* (2013.01); *G06F 17/2785* (2013.01);
(Continued)

(58) Field of Classification Search
CPC ............... G06F 17/28; G06F 17/30654; G06F 17/30684; G06F 2221/2141
See application file for complete search history.

(56) References Cited

U.S. PATENT DOCUMENTS

| | | | |
|---|---|---|---|
| 5,933,822 A * | 8/1999 | Braden-Harder | ........................... G06F 16/3344 |
| 6,202,066 B1 * | 3/2001 | Barkley | .............. G06F 21/6218 707/785 |

(Continued)

OTHER PUBLICATIONS

Ferrucci, D., Brown, E., Chu-Carroll, J., Fan, J., Gondek, D., Kalyanpur, A.A., Lally, A., Murdock, J.W., Nyberg, E., Prager, J. and Schlaefer, N., 2010. Building Watson: An overview of the DeepQA project. AI magazine, 31(3), pp. 59-79. (Year: 2010).*

(Continued)

*Primary Examiner* — James R Turchen
(74) *Attorney, Agent, or Firm* — Pepper Hamilton LLP

(57) ABSTRACT

Embodiments are directed to a question and answer (QA) pipeline system that adjusts answers to input questions based on a user criteria, thus implementing a content-based determination of access permissions. The QA system allows for information to be retrieved based on permission granted to a user. Documents are ingested and assigned an access level based on a defined information access policy. The QA system is implemented with the defined information access policy, the ingested documents, and the inferred access levels. For the QA system implementation, a user enters a question; primary search and answer extraction stages are performed; candidate answer extraction is performed using only content the user is allowed to access; the candidate answers are scored, ranked, and merged; ranked answers based on user permissions are filtered; and answers are provided to the user.

17 Claims, 5 Drawing Sheets

(51) Int. Cl.
*G06F 17/28* (2006.01)
*G06F 21/62* (2013.01)

(52) U.S. Cl.
CPC .......... *G06F 17/28* (2013.01); *G06F 21/6245* (2013.01); *H04L 63/102* (2013.01); *H04L 63/105* (2013.01); *G06F 2221/2141* (2013.01)

(56) References Cited

U.S. PATENT DOCUMENTS

| | | | |
|---|---|---|---|
| 8,291,471 | B2 | 10/2012 | Piccinini et al. |
| 8,646,027 | B2 | 2/2014 | Malaviarachchi et al. |
| 8,806,656 | B2 | 8/2014 | Roy et al. |
| 8,832,150 | B2 | 9/2014 | O'Sullivan et al. |
| 8,918,901 | B2 | 12/2014 | Mandava et al. |
| 8,943,316 | B2 | 1/2015 | Vainstein |
| 9,665,662 | B1* | 5/2017 | Gautam ................. G06F 16/26 |
| 2003/0225720 | A1 | 12/2003 | Farlow et al. |
| 2004/0138904 | A1 | 7/2004 | La Loggia et al. |
| 2006/0080316 | A1 | 4/2006 | Gilmore et al. |
| 2009/0089882 | A1 | 4/2009 | Hofmann et al. |
| 2009/0328156 | A1 | 12/2009 | Malaviarachchi et al. |
| 2010/0042660 | A1 | 2/2010 | Rinearson et al. |
| 2011/0112921 | A1* | 5/2011 | Kennewick ........ G06Q 30/0601 705/26.1 |
| 2011/0125734 | A1 | 5/2011 | Duboue et al. |
| 2012/0078888 | A1* | 3/2012 | Brown ................. G06F 16/3329 707/723 |
| 2012/0303558 | A1* | 11/2012 | Jaiswal .................. G06N 20/00 706/12 |
| 2014/0358964 | A1* | 12/2014 | Woods ................ G06F 16/3329 707/769 |
| 2014/0365527 | A1 | 12/2014 | Fuchs et al. |
| 2015/0033327 | A1 | 1/2015 | Naglost et al. |
| 2015/0172294 | A1* | 6/2015 | Bittner .................... G06F 16/00 726/4 |
| 2015/0235130 | A1 | 8/2015 | Contreras et al. |
| 2015/0324609 | A1* | 11/2015 | Grubel ................... G06F 21/64 726/26 |
| 2016/0124962 | A1 | 5/2016 | Barborak et al. |

OTHER PUBLICATIONS

Yuan et al., "Watson and healthcare: How natural language processing and sematic Search could revolutionize clinical decision support," IBM developerWorks, Apr. 12, 2011.

High, "The Era of Cognitive Systems: An Inside Look at IBM Watson and How it Works," IBM Redbooks, Dec. 12, 2012.

Final Office Action dated Feb. 7, 2019 in corresponding U.S. Appl. No. 15/273,152.

Non-Final Office Action dated Mar. 27, 2018 in corresponding U.S. Appl. No. 15/273,152.

* cited by examiner

METHOD TO ALLOW FOR QUESTION AND ANSWER SYSTEM TO DYNAMICALLY RETURN DIFFERENT RESPONSES BASED ON ROLES

BACKGROUND

Question and answer systems utilize the same corpus content for all users when formulating answers. However, in many information access scenarios, differential access to different users is desired. For example, differential access may be preferred for the following situations: if a user has paid for additional and/or high value content, when confidential information is shared within a company versus externally-visible information, and when special information (e.g., security clearance information, health care information, etc.) access is granted to certain individuals. When differential access is assigned in current question and answer systems, access privileges are typically assigned at a file-space permissions level or by static user profiles matched to document-level metadata such as tagging particular documents with appropriate tags (e.g., "company confidential" tags). Such methods are manually determined and are time consuming.

Thus, an improved question and answer system that allows for differential access for different users is desired.

SUMMARY

Embodiments are directed to a computer-implemented method, a computer program product, and a system for adjusting answers to questions based on a user criteria.

In an embodiment, the computer-implemented method is implemented in a system capable of answering questions, the system comprising a processor and a memory comprising instructions executed by the processor.

In an embodiment, the computer program product comprises a computer readable storage medium having program instructions embodied therewith, the program instructions executable by a processor.

In an embodiment, the system comprises a processor and a memory, which comprises instructions executed by the processor.

In an embodiment, the processor executes the steps of: receiving a question from a user with a user profile comprising one or more of a responsibility role and a permission level; deriving a content access constraint criteria from the one or more of the responsibility role and the permission level; applying natural language processing (NLP) and deep analytic analysis to content restricted to the content access constraint criteria to form an answer to the question; and providing to the user a notification comprising the answer to the question.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
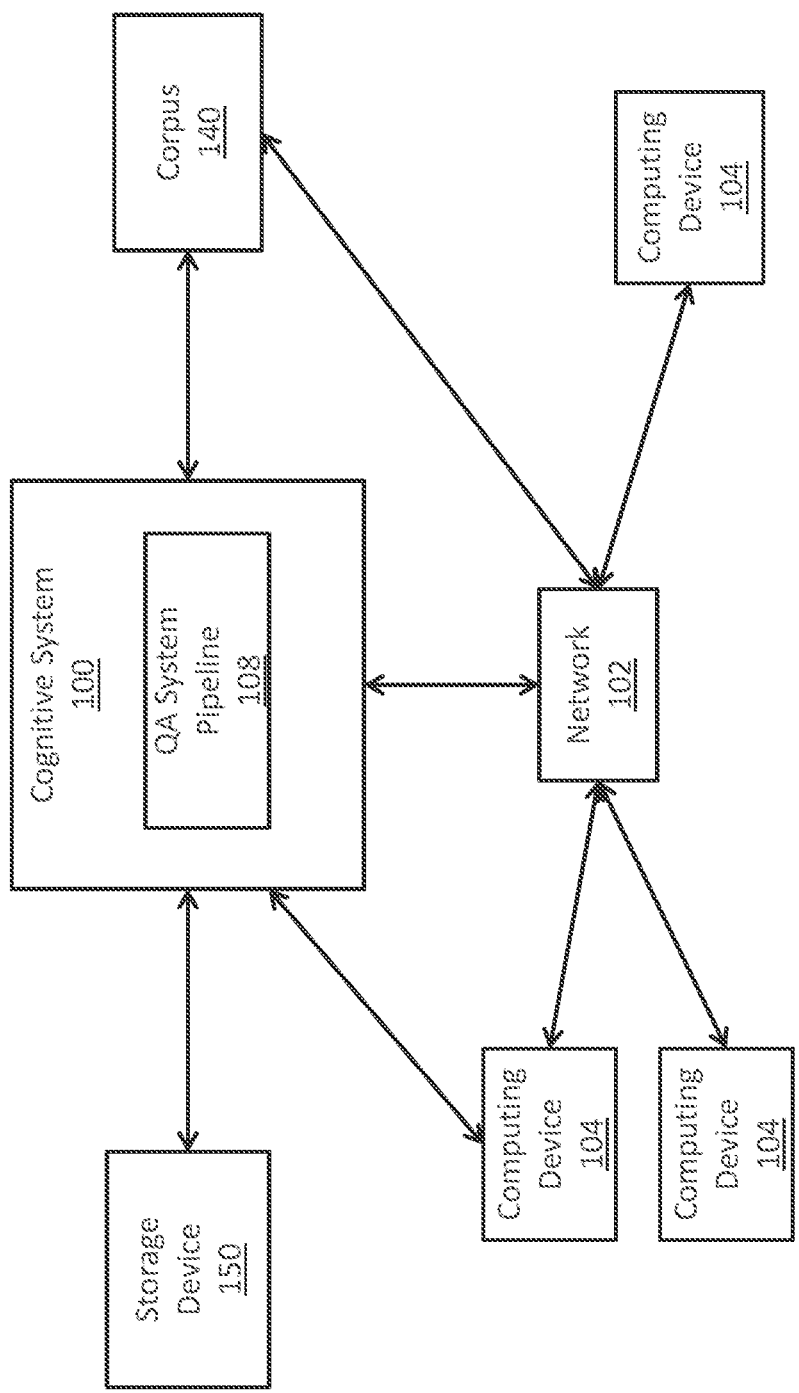
FIG. 1 depicts a schematic diagram of an embodiment of a cognitive system implementing a question and answer (QA) generation system in a computer network.

Embodiments are directed to content-based determination of access permissions for a question and answer system. By allowing for different ingested content to be used based on user privileges and/or user criteria, flexibility is introduced into a question and answer system. Moreover, paid-content providers are able to incentivize customers to upgrade to higher paid service levels. According to embodiments herein, sensitive information in documents can be protected without the need to manually tag more restrictive access levels by system administrators.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding

Ingest and process vast amounts of structured and unstructured data

Generate and evaluate hypotheses

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situation awareness that mimics human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area (e.g., financial domain, medical domain, legal domain, etc.) where the body of knowledge (knowledgebase) can be organized in a variety of configurations, e.g., a structured repository of domain-specific information, such as ontologies, or unstructured data related to the domain, or a collection of natural language documents about the domain.

Content users input questions to the cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using natural language processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e., candidate answer, is inferred by the question. This process is repeated for each of the candidate answers until the QA pipeline identifies candidate answers that surface as being significantly stronger than others and thus generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identity documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify question and answer attributes of the content.

Operating on such content, the QA pipeline generates answers for input questions using a plurality of intensive analysis mechanisms which evaluate the content to identify the most probable answers, i.e., candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question and answer (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices. Other embodiments of the cognitive system 100 may be used with components, systems, sub-systems, and/or devices other than those that are depicted herein.

The cognitive system 100 is configured to implement a QA pipeline 108 that receives inputs from various sources. For example, the cognitive system 100 receives input from the network 102, a corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 140 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 140. In one embodiment, the questions are formed using natural language. The cognitive system 100 parses and interprets the question via a QA pipeline 108, and provides a response to the cognitive system user containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 140. The QA pipeline 108 generates answers for the input question based on the processing of the input question and the corpus of data 140. The QA pipeline 108 is described in greater detail with regard to FIG. 2.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question, which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e., candidate answer, is inferred by the question. This process is repeated for each of the candidate answers to generate a ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware.

Results from the corpus 140 are stored in storage device 150 associated with either the cognitive system 100, where the storage device 150 may be a memory, a hard disk based storage device, flash memory, solid state storage device, or the like (hereafter assumed to be a "memory" with in-memory representations of the acyclic graphs for purposes of description).

Figure 2:
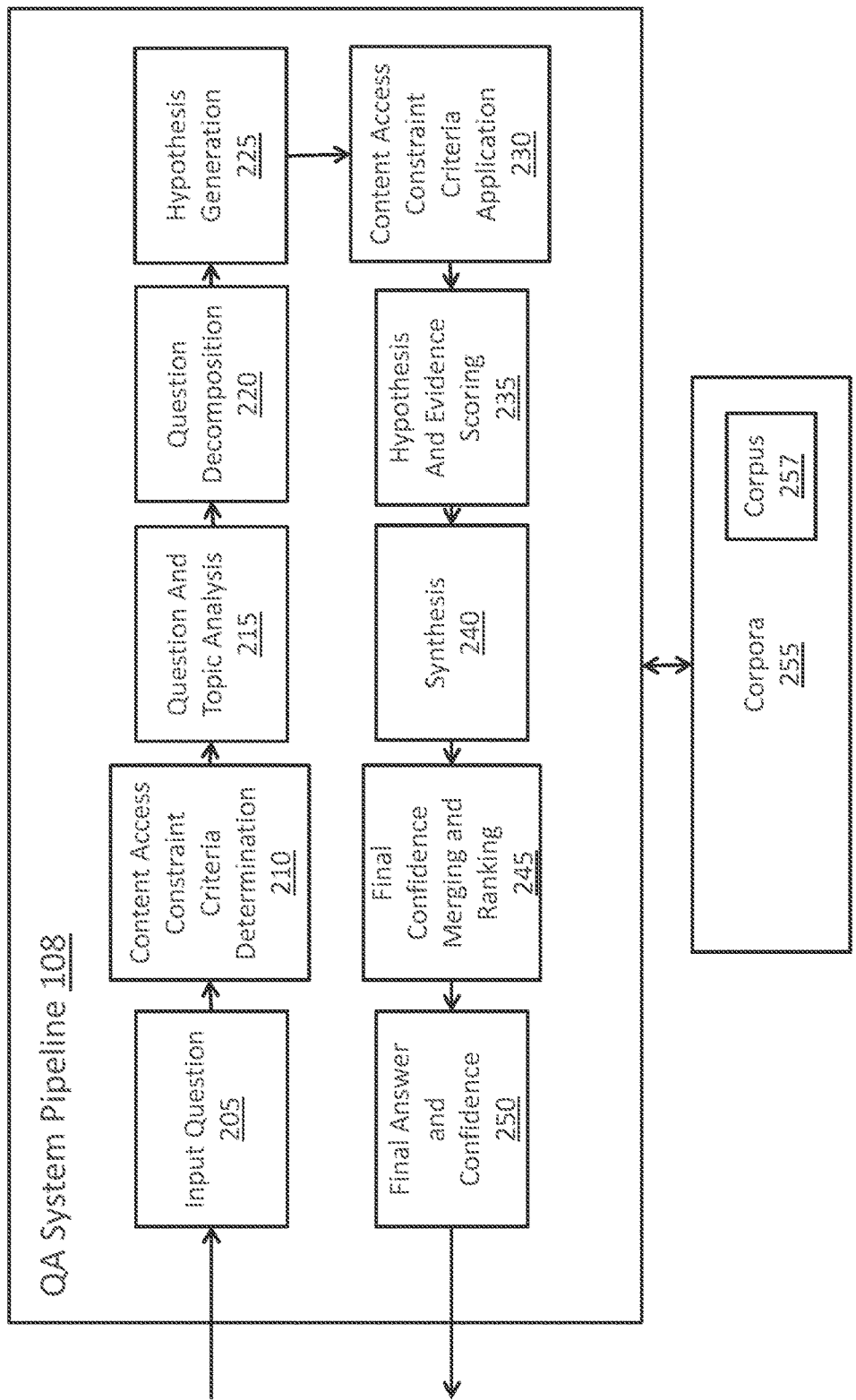
FIG. 2 illustrates a QA system pipeline, of a cognitive system, for processing an input question, according to an embodiment.

FIG. 2 illustrates a QA system pipeline 108, of a cognitive system, for processing an input question. The QA system pipeline 108 of FIG. 2 may be implemented, for example, as QA pipeline 108 of cognitive system 100 in FIG. 1. It should be appreciated that the stages as shown in FIG. 2 are implemented as one or more software engines, components, or the like, which are configured with logic for implementing the functionality attributed to the particular stage. Each stage is implemented using one or more of such software engines, components or the like. The software engines, components, etc., are executed on one or more processors of one or more data processing systems or devices and utilize or operate on data stored in one or more data storage devices, memories, or the like, on one or more of the data processing systems. Additional stages may be provided to implement the improved mechanism, or separate logic from the pipeline 108 may be provided for interfacing with the pipeline 108 and implementing the improved functionality and operations of the illustrative embodiments provided herein.

As shown in FIG. 2, the QA pipeline 108 comprises a plurality of stages 205-250 through which the cognitive system operates to analyze an input question and generate a final response. According to embodiments herein, the QA pipeline 108 operates to adjust answers to input questions based on a user criteria, thus implementing a content-based determination of access permissions.

In an initial question input stage 205, the QA pipeline 108 receives an input question that is presented in a natural language format. According to an embodiment, the input question is inputted by a user with a user profile that includes one or more of a responsibility role and a permission level. That is, a user inputs, via a user interface, an input question for which the user wishes to obtain an answer, e.g., "Who are Washington's closest advisors?"

In response to receiving the input question, the next stage of the QA pipeline 108, i.e., content access constraint criteria determination stage 210, derives from the one or more of the responsibility role and the permission level a content access constraint criteria for the input question. The content access constraint criteria is utilized to restrict content based on the user's responsibility role and/or permission level.

The next stage of the QA pipeline 108, i.e., the question and topic analysis stage 215, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referenced to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?" the LAT is the string "maneuver." The focus of a question is the part of the question that, if replaced by the answer, makes the question a standalone statement. For example, in the question "What drug has been shown to relieve the symptoms of ADD with relatively few side effects?," the focus is "What drug" since this phrase can be replaced with the answer, e.g., "Adderall," to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 2, the identified major features are then used during the question decomposition stage 220 to decompose the question into one or more queries that are applied to the corpora of data/information 255 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 255. That is, these various sources themselves, different collections of sources, and the like, represent a different corpus 257 within the corpora 255. There may be different corpora 257 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 257 within the corpora 255.

The queries are applied to one or more databases storing information about the electronic texts, documents, articles, websites, and the like, that make up the corpus of data/information, e.g., the corpus of data 140 in FIG. 1. The queries are applied to the corpus of data/information at hypothesis generation stage 225 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 225, to generate hypotheses for answering the input question. These hypotheses are also referred to herein as "candidate answers" for the input question. For any input question, at this stage 225, there may be hundreds of hypotheses or candidate answers generated that may need to be evaluated.

At the next stage, content access constraint criteria application stage 230, the responsibility role and/or the permission level associated with the user of the input question is applied to the candidate answers generated at stage 225. That is, the determined content access constraint criteria is used to block or allow (i.e., filter) answers. According to an embodiment, for each candidate answer received, an access level is inferred. If a candidate answer is manually tagged with a particular access level, that particular access level is utilized. Deep NLP/feature extraction may be performed on each text segment to infer the access level. In another embodiment, a rules-based policy or classification-based policy is applied to determine an access level. Once the access levels for the candidate answers are determined, they are compared to the user's content access constraint criteria. Answers with an access level higher than that assigned to the user, as identified by the content access constraint criteria, are removed from the pool of candidate answers. Similarly, if one or more particular text segments (e.g., passage, subsection, paragraph, chapter, article, and the like) of a candidate answer has an access level that conflicts with that of the user, that one or more particular text segment may be extracted while a remaining portion of the candidate answer is available.

The QA pipeline 108, in stage 235, then performs a deep analysis and comparison of the language of the input question and the language of each hypothesis or "candidate answer" filtered by the previous stage 230, as well as performs evidence scoring to evaluate the likelihood that the particular hypothesis is a correct answer for the input question. As described in FIG. 1, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e., a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

In an embodiment, the content access constraint criteria application may be performed at this later stage. That is, the responsibility role and/or the permission level associated with the user of the input question is applied to the analyzed and scored answers generated at stage 235.

In the synthesis stage 240, the large number of scores generated by the various reasoning algorithms are synthesized into confidence scores or confidence measures for the various hypotheses. This process involves applying weights to the various scores, where the weights have been determined through training of the statistical model employed by the QA pipeline 108 and/or dynamically updated. For example, the weights for scores generated by algorithms that identify exactly matching terms and synonyms may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 108 that identifies a manner by which these scores may be combined to generate a confidence score or measure for the individual hypotheses or candidate answers. This confidence score or measure summarizes the level of confidence that the QA pipeline 108 has about the evidence that the candidate answer is inferred by the input question, i.e., that the candidate answer is the correct answer for the input question.

The resulting confidence scores or measures are processed by a final confidence merging and ranking stage 245 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 250, a final answer and confidence score, or final set of candidate answers and confidence scores, are generated and output to the submitter of the original input question via a graphical user interface (GUI) or other mechanism for outputting information.

According to an embodiment herein, ranked answers may be filtered based on user permissions. For example, answers to a user may be shown depending on the user's permission level and/or responsibility role, e.g., show answers to user if user has access to all content or show a certain percentage of answers based on the user's permission level and/or responsibility role.

According to an embodiment, along with the final set of candidate answers and confidence scores, where the candidate answers or portions thereof are restricted to reflect the access level of the user, evidence of the adjusted answers may be provided to the user via the GUI or other mechanism. The evidence may include, for example, an indication of access levels of the answers being provided. Moreover, areas where content is redacted may be indicated, and teasers (i.e., a portion of redacted content) may be shown.

Figure 3:
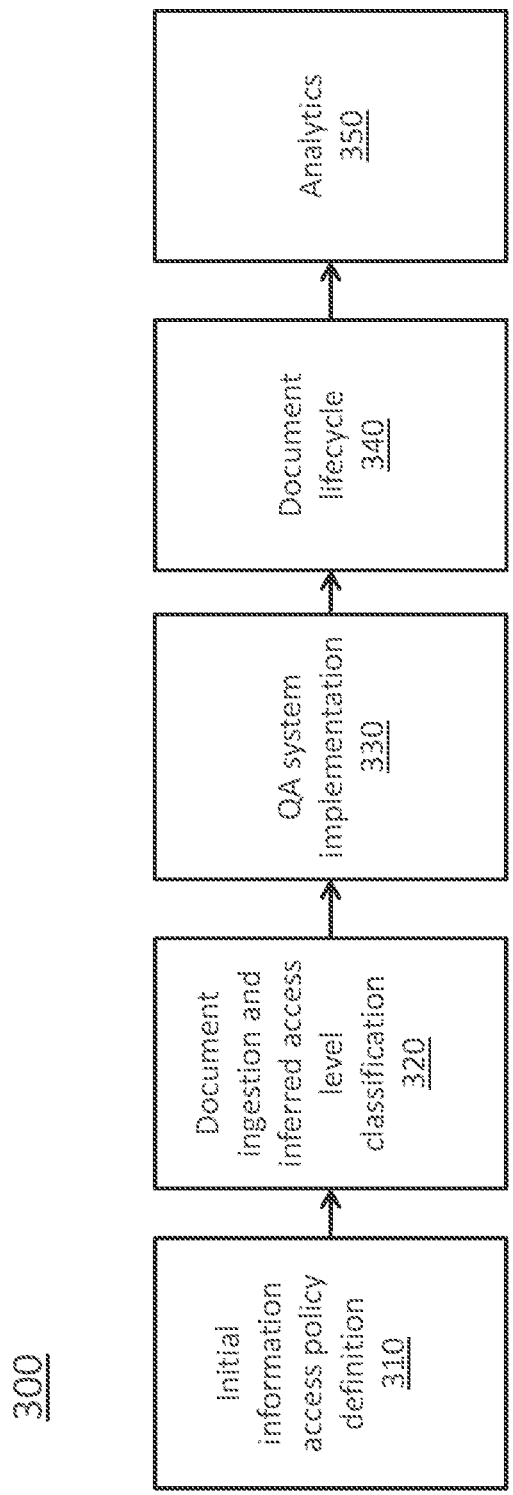
FIG. 3 is a flow diagram illustrating stages for adjusting answers to questions based on a user criteria in a QA system, according to an embodiment.

In an embodiment, and with reference to FIG. 3, a flow diagram 300 illustrates the stages for adjusting answers to questions based on a user criteria in a QA system, such as the QA system pipeline 108. First, the initial information access policy is defined at stage 310. The information access policy refers to how content is marked and identified to be assigned an access level. In an embodiment, individual documents may be tagged with access levels; such manually-tagged permissions are taken as supervised training examples for the QA system 108. In another embodiment, a rules engine may be utilized to record access policy rules. For example, a rule may specify that managers are allowed to view employee salaries of employees within their organization, or that salesman are allowed to view deals, terms, and project durations for contracts established within their territory of responsibility. In yet another embodiment, access rights may be described in terms of individual annotations or thresholds based on items that are output from deep NLP analysis of the documents. For example, free website members may view portions of documents with no more than N analysis statements or no more than X geopolitical entities.

The second stage is document ingestion and inferred access level classification 320. At ingestion time, manually tagged documents are sent for deep NLP processing. A model characterizing documents for each access level may be generated by extracting features from manually-tagged documents. Features of the inferred access level classification process include, but are not limited to: particular entity types, relation types, and predicates with the document content; indicating words such as section headers, document titles, or other metadata features; particular annotations produced by document analysis identifying high-value content determined by the domain, such as, for example, stock analysis, intelligence, insights, corporate product comparisons, or market analysis.

Stage 330 comprises implementing the question-answer system (e.g., QA system pipeline 108), as described above with reference to FIG. 2, with the defined information access policy, the ingested documents, and the inferred access level classifications. To summarize the QA system implementation: a user enters a question; primary search and answer extraction stages are performed to block or allow primary search retrieved content; candidate answer extraction is performed using only content the user is allowed to access; all content or only content allowed to be accessed by the user is utilized to score, rank, and merge candidate answers; ranked answers are filtered based on user permissions; and answers plus evidence are sent to the user.

Stage 340 comprises the document lifecycle. As documents are modified (i.e., re-ingesting a particular document), the document may be erroneously marked as globally accessible. Thus, according to an embodiment herein, documents may be analyzed and, depending on the configuration, the access level may be updated or the document may be flagged for human review.

Stage 350 comprises analytics. According to an embodiment, the QA system 108 is able to report the number of user queries that cannot be answered based on current access level. This information may be used to suggest or recommend a different number of access levels, for example. In another example of analytics, it may be useful in a ground truth collection tool to indicate the access level of the users performing the populating of the content. The access levels of these users may be modulated to include the corpus coverage they are able to annotate.

Figure 4:
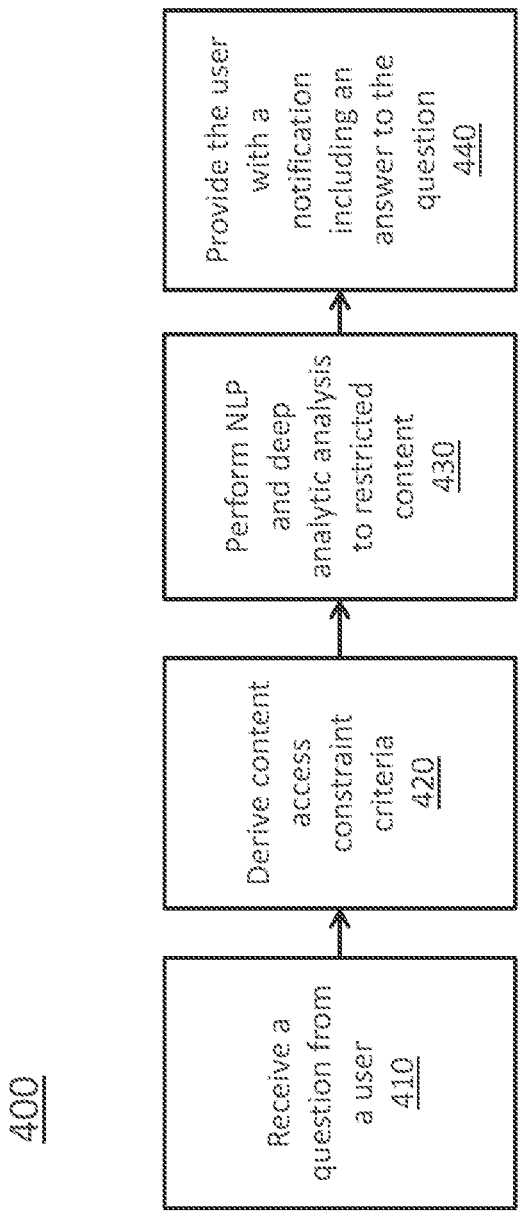
FIG. 4 is a flowchart of a method for adjusting answers to questions based on a user criteria in a QA system, in accordance with an embodiment.

FIG. 4 is a flowchart 400 of a method for adjusting answers to questions based on a user criteria in a QA system, such as the QA system pipeline 108, in accordance with an embodiment.

At 410, a question from a user is received. The user has a user profile comprising one or more of a responsibility role and a permission level. In an embodiment, the permission level may be based on a subscription of the user; for example, a subscription to a particular magazine or newspaper.

At 420, a content access constraint criteria is derived from the one or more of the responsibility role and the permission level. In an embodiment, the content access constraint criteria controls access to embedded content in documents based on a passage classifier model analysis including accumulated discovery. In an embodiment, a first responsibility role for a first employee without management responsibility receives a more restrictive content access constraint criteria than a second employee with management responsibility.

At 430, natural language processing (NLP) and deep analytic analysis is applied to content restricted to the content access constraint criteria to form an answer to the question.

At 440, the user is provided with a notification comprising the answer to the question.

According to embodiments provided herein, access permissions are dynamically determined, thus allowing more flexibility of access of content. The question and answer system and methods provided herein that allow for differential access for different users have several advantages: less time is required from the corpus administrator to manually tag documents; more levels of access permissions and/or a variety of policy controls are encouraged to be established to reflect an organization's desired information access; document access can be modified over time as the document content changes; content control can be partitioned at a finer grained level such as by paragraph, sentence, or individual facts; the restriction on a document that human administrators neglected to protect can be upgraded (such as a document with information that should be restricted to company-confidential level, but which was not tagged that way by the document author).

An example use case is as follows: a publication displays different data if a customer is currently a paid subscriber. A non-subscriber receives a summary of the requested information, potentially with a teaser such as "we have more answers available for gold level subscription," and a paid subscriber receives detailed requested information. This provides an encouragement for more paid users to join. In another example, an employee website returns information based on whether the employee is a manager or non-manager. In yet another example, an employee website for a government project contains confidential and non-confidential data. Users permitted to see confidential data are allowed to access data not permitted for users granted this type of access. Of course, depending on the use case, administrators may wish to allow or disallow inferred document access levels. In an example embodiment, the QA system 108 may be configured to only UPGRADE (tighten) the document's access level and never DOWNGRADE (loosen) access constraints.

In an example workflow for the question and answer system and methods provided herein that allow for differential access for different users, the system may validate whether the manually-assigned access level fits the document content. Additionally, the system may recommend a number of access levels based on various factors, such as number of users, type of organization, and type and amount of content (e.g., an organization may need five different sensitivity levels instead of the current three). Moreover, the system allows for a company to not manually tag every document; instead, a training corpus with levels may be provided, and content is automatically tagged. Documents that are desired to be sent to external customers may be analyzed so that confidential content is redacted or removed, and the remaining content can be sent externally.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
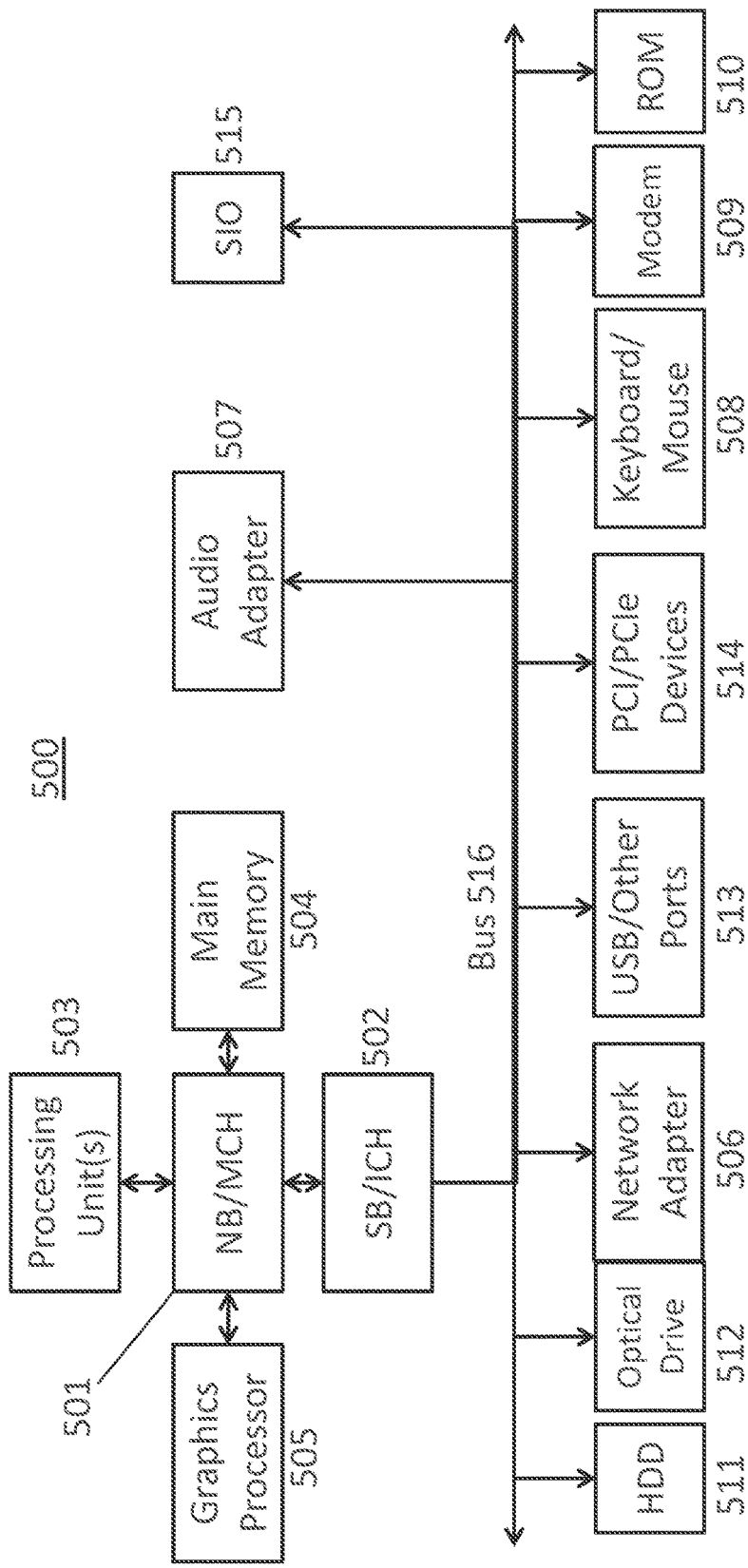
FIG. 5 is a block diagram of an example data processing system in which aspects of the illustrative embodiments are implemented.

FIG. 5 is a block diagram of an example data processing system 500 in which aspects of the illustrative embodiments are implemented. Data processing system 500 is an example of a computer, such as a server or client, in which computer usable code or instructions implementing the process for illustrative embodiments are located. In one embodiment, FIG. 5 represents a server computing device, such as a server, which implements the cognitive system 100 described herein.

In the depicted example, data processing system 500 can employ a hub architecture including a north bridge and memory controller hub (NB/MCH) 501 and south bridge and input/output (I/O) controller hub (SB/ICH) 502. Processing unit 503, main memory 504, and graphics processor 505 can be connected to the NB/MCH 501. Graphics processor 505 can be connected to the NB/MCH 501 through, for example, an accelerated graphics port (AGP).

In the depicted example, a network adapter 506 connects to the SB/ICH 502. An audio adapter 507, keyboard and mouse adapter 508, modem 509, read only memory (ROM) 505, hard disk drive (HDD) 511, optical drive (e.g., CD or DVD) 512, universal serial bus (USB) ports and other communication ports 513, and PCI/PCIe devices 514 may connect to the SB/ICH 502 through bus system 516. PCI/PCIe devices 514 may include Ethernet adapters, add-in cards, and PC cards for notebook computers. ROM 505 may be, for example, a flash basic input/output system (BIOS). The HDD 511 and optical drive 512 can use an integrated drive electronics (IDE) or serial advanced technology attachment (SATA) interface. A super I/O (SIO) device 515 can be connected to the SB/ICH 502.

An operating system can run on processing unit 503. The operating system can coordinate and provide control of various components within the data processing system 500. As a client, the operating system can be a commercially available operating system. An object-oriented programming system, such as the Java programming system, may run in conjunction with the operating system and provide calls to the operating system from the object-oriented programs or applications executing on the data processing system 500. As a server, the data processing system 500 can be an IBM® eServer™ System p running the Advanced Interactive Executive operating system or the Linux operating system. The data processing system 500 can be a symmetric multiprocessor (SMP) system that can include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments of the question and answer system pipeline 108, described herein, can be performed by the processing unit 503 using computer usable program code, which can be located in a memory such as, for example, main memory 504, ROM 505, or in one or more peripheral devices.

A bus system 516 can be comprised of one or more busses. The bus system 516 can be implemented using any type of communication fabric or architecture that can provide for a transfer of data between different components or devices attached to the fabric or architecture. A communication unit such as the modem 509 or the network adapter 506 can include one or more devices that can be used to transmit and receive data.

Those of ordinary skill in the art will appreciate that the hardware depicted in FIG. 5 may vary depending on the implementation. Other internal hardware or peripheral devices, such as flash memory, equivalent non-volatile memory, or optical disk drives may be used in addition to or in place of the hardware depicted. Moreover, the data processing system 500 can take the form of any of a number of different data processing systems, including but not limited to, client computing devices, server computing devices, tablet computers, laptop computers, telephone or other communication devices, personal digital assistants, and the like. Essentially, data processing system 500 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method for adjusting answers to questions based on a user criteria by an information handling system capable of answering questions, the system comprising a processor and a memory comprising instructions executed by the processor, the method comprising:
   manually tagging documents for deep natural language processing (NLP);
   extracting features from the manually-tagged documents;
   providing each of a plurality of documents with an access level based on extracted features;
   receiving a question from a user having a user profile comprising a responsibility role of the user and a permission level of the user;
   deriving a content access constraint criteria of the user from the responsibility role and the permission level;
   generating a plurality of candidate answers for the question;
   removing one or more candidate answers from the plurality of candidate answers, wherein the one or more candidate answers have an access level higher than the content access constraint criteria of the user, wherein the access level is provided by performing deep NLP and feature extraction on each text segment of each document, wherein the extracted features include particular entity types, relation types, predicates, and indicating words;
   applying natural language processing, deep analytic analysis, and evidence scoring to the plurality of documents having the access level no higher than the content access constraint criteria to select an answer to the question from the remaining candidate answers; and
   providing to the user a notification comprising the answer to the question.

2. The method of claim 1, wherein the permission level is based on a subscription.

3. The method of claim 1, wherein the content access constraint criteria controls access to embedded content in documents based on a passage classifier model analysis including accumulated discovery.

4. The method of claim 3, wherein a first responsibility role for a first employee without management responsibility receives a more restrictive content access constraint criteria than a second employee with management responsibility.

5. The method of claim 1, wherein the access level is provided by applying a classification-based policy.

6. The method of claim 1, wherein, in addition to the notification comprising the answer to the question, the user is provided with an indication of the access level of the answer being provided.

7. A computer program product for adjusting answers to questions based on a user criteria by an information handling system capable of answering questions, the computer program product comprising a computer readable storage medium having program instructions embodied therewith, the program instructions executable by a processor to cause the processor to:
   manually tag documents for deep natural language processing (NLP);
   extract features from the manually-tagged documents;

provide each of a plurality of documents with an access level based on extracted features;
receive a question from a user having a user profile comprising a responsibility role of the user and a permission level of the user;
derive a content access constraint criteria of the user from the responsibility role and the permission level;
generate a plurality of candidate answers for the question;
remove one or more candidate answers from the plurality of candidate answers, wherein the one or more candidate answers have an access level higher than the content access constraint criteria of the user, wherein the access level is provided by performing deep NLP and feature extraction on each text segment of each document, wherein the extracted features include particular entity types, relation types, predicates, and indicating words;
apply natural language processing, deep analytic analysis, and evidence scoring to the plurality of documents having the access level no higher than the content access constraint criteria to select an answer to the question from the remaining candidate answers; and
provide to the user a notification comprising the answer to the question.

8. The computer program product of claim 7, wherein the permission level is based on a subscription.

9. The computer program product of claim 7, wherein the content access constraint criteria controls access to embedded content in documents based on a passage classifier model analysis including accumulated discovery.

10. The computer program product of claim 9, wherein a first responsibility role for a first employee without management responsibility receives a more restrictive content access constraint criteria than a second employee with management responsibility.

11. The computer program product of claim 7, wherein the access level is provided by applying a classification-based policy.

12. A system for adjusting answers to questions based on a user criteria by an information handling system capable of answering questions, the system comprising:
a memory comprising executable instructions; and
a processor configured to execute the executable instructions to:
manually tag documents for deep natural language processing (NLP);
extract features from the manually-tagged documents;
provide each of a plurality of documents with an access level based on extracted features;
receive a question from a user having a user profile comprising a responsibility role of the user and a permission level of the user;
derive a content access constraint criteria of the user from the responsibility role and the permission level;
generate a plurality of candidate answers for the question;
remove one or more candidate answers from the plurality of candidate answers,
wherein the one or more candidate answers have an access level higher than the content access constraint criteria of the user, wherein the access level is provided by performing deep NLP and feature extraction on each text segment of each document, wherein the extracted features include particular entity types, relation types, predicates, and indicating words;
apply natural language processing, deep analytic analysis, and evidence scoring to the plurality of documents having the access level no higher than the content access constraint criteria to select an answer to the question from the remaining candidate answers; and
provide to the user a notification comprising the answer to the question.

13. The system of claim 12, wherein the permission level is based on a subscription.

14. The system of claim 12, wherein the content access constraint criteria controls access to embedded content in documents based on a passage classifier model analysis including accumulated discovery.

15. The system of claim 14, wherein a first responsibility role for a first employee without management responsibility receives a more restrictive content access constraint criteria than a second employee with management responsibility.

16. The system of claim 12, wherein the access level is provided by applying a classification-based policy.

17. The system of claim 12, wherein, in addition to the notification comprising the answer to the question, the user is provided with an indication of the access level of the answer being provided.

* * * * *